United States Patent
Bryans et al.

(10) Patent No.: US 11,082,769 B2
(45) Date of Patent: Aug. 3, 2021

(54) AUDIO VISUALIZATION IN TELECOMMUNICATIONS APPLICATIONS

(71) Applicant: Bose Corporation, Framingham, MA (US)

(72) Inventors: Darryl John Bryans, Natick, MA (US); Zubair Khan, Sudbury, MA (US); Jenna Duggan-Lykes, Roslindale, MA (US); Michael Pocino, Marietta, GA (US)

(73) Assignee: Bose Corporation, Framingham, MA (US)

( * ) Notice: Subject to any disclaimer, the term of this patent is extended or adjusted under 35 U.S.C. 154(b) by 0 days.

(21) Appl. No.: 16/685,426

(22) Filed: Nov. 15, 2019

(65) Prior Publication Data

US 2021/0152930 A1    May 20, 2021

(51) Int. Cl.
*H04R 3/00* (2006.01)
*H04R 1/40* (2006.01)
(Continued)

(52) U.S. Cl.
CPC .............. *H04R 3/005* (2013.01); *G06F 3/165* (2013.01); *H04R 1/406* (2013.01); *H04R 27/00* (2013.01); *H04R 2201/401* (2013.01)

(58) Field of Classification Search
CPC ........ H04R 3/005; H04R 1/406; H04R 27/00; H04R 2201/401; G06F 3/16; G06F 3/165;
(Continued)

(56) References Cited

U.S. PATENT DOCUMENTS

| | | | |
|---|---|---|---|
| 8,971,623 B2 * | 3/2015 | Gatt | G06F 3/0484 382/167 |
| 9,286,898 B2 | 3/2016 | Xiang et al. | |

(Continued)

FOREIGN PATENT DOCUMENTS

| | | |
|---|---|---|
| WO | 2012097314 | 7/2012 |
| WO | 2016053316 | 4/2016 |
| WO | 2019231630 | 12/2019 |

OTHER PUBLICATIONS

Real-time Steering Array Microphone System. Product Webpage [online]. TOA Electronics, Inc. [retrieved on Apr. 20, 2020]. Retrieved from the Internet <URL: https://www.toaelectronics.com/product/AM-1>.

(Continued)

*Primary Examiner* — Xu Mei
(74) *Attorney, Agent, or Firm* — Bond, Schoeneck & King, PLLC

(57) ABSTRACT

An audio system and method for enhancing audio quality in telecommunications applications. Specifically, a graphical user interface (GUI) is provided to allow an observer to visualize pickup zones within an environment that schematically represent areas of heightened microphone sensitivity. A microphone array and camera are arranged to obtain an audio signal and an image which correspond to a talker within the environment. The images are displayed via a first device or are transmitted to a second device and are displayed to the observer, while the audio signal is converted into an audio output by the second device. Visual overlays are provided, via the visualization window, corresponding with pickup zones within the environment corresponding to areas of heightened microphone sensitivity. The observer may adjust the visual overlay corresponding with each pickup zone using the GUI provided, resulting in an adjust- (Continued)

ment of the pickup zones by the microphone array within the environment.

20 Claims, 11 Drawing Sheets

(51) Int. Cl.
*H04R 27/00* (2006.01)
*G06F 3/16* (2006.01)

(58) Field of Classification Search
CPC ......... G06F 3/167; G06F 16/44; G10K 11/34; G10K 11/343
USPC ......... 381/61, 91, 92, 122; 700/94; 715/716; 367/138
See application file for complete search history.

(56) References Cited

U.S. PATENT DOCUMENTS

| | | | |
|---|---|---|---|
| 10,645,517 B1* | 5/2020 | Ramirez Flores | H04R 3/04 |
| 2003/0009329 A1* | 1/2003 | Stahl | H04R 3/005 |
| | | | 704/233 |
| 2004/0114772 A1* | 6/2004 | Zlotnick | H04R 3/12 |
| | | | 381/92 |
| 2010/0020951 A1 | 1/2010 | Basart et al. | |
| 2011/0013075 A1 | 1/2011 | Kim et al. | |
| 2011/0193933 A1* | 8/2011 | Ryu | H04N 7/142 |
| | | | 348/14.08 |
| 2015/0237455 A1 | 8/2015 | Mitra et al. | |
| 2017/0013225 A1* | 1/2017 | Takahashi | H04N 5/44504 |
| 2019/0069080 A1* | 2/2019 | Abrams | G06F 3/165 |

OTHER PUBLICATIONS

AM-1 Mounting Bracket Kit. Installation Manual [online]. TOA Electronics, Inc., 2016 [retrieved on Apr. 20, 2020]. Retrieved from the Internet: <URL: https://www.toaelectronics.com/document/9-real-time-steering-array-microphone-system-manuals.pdf>.

AM-1 Real-time steering array microphone. Brochure [online]. TOA Electronics, Inc., 2017 [retrieved on Apr. 20, 2020]. Retrieved from the Internet: <URL: https://www.toaelectronics.com/document/7-real-time-steering-array-microphone-system-brochure.pdf>.

YouTube video clip entitled "Biamp Tesira: Tesira® Beamtracking™ Microphone Demo," 1 page, uploaded on Aug. 30, 2018 by user "Biamp". Retrieved from Internet: <https://www.youtube.com/watch?v=DOHYQQ_IHFo>.

Parlé TTM-X Microphone Installation & Operation Guide. Installation Manual [online]. Biamp Systems, Aug. 2019 [retrieved on Apr. 20, 2020]. Retrieved from the Internet: <URL: https://www.mennegat.nl/media/shop_item/parle_ttm-x_mic__operation_installation_guide_aug19.pdf>.

Parlé-series Beamtracking Microphones. Support Webpage [online]. Biamp Systems [retrieved on Apr. 20, 2020]. Retrieved from the Internet <URL: https://support.biamp.com/Tesira/Parle_microphones/Parl%C3%A9-series_Beamtracking_Microphones>.

International Search Report and the Written Opinion of the International Searching Authority, International Patent Application No. PCT/US2020/053497, pp. 1-15, dated Dec. 10, 2020.

* cited by examiner

AUDIO VISUALIZATION IN TELECOMMUNICATIONS APPLICATIONS

BACKGROUND

This disclosure generally relates to telecommunications applications, specifically, to systems and methods for enhancing audio quality in telecommunications applications.

SUMMARY OF THE DISCLOSURE

The present disclosure is directed to an audio system and method for enhancing audio quality in telecommunications applications. Specifically, the methods and systems discussed herein utilize a visualization window of a graphical user interface (GUI) to allow an observer to visualize pickup zones within an environment that schematically represent areas of heightened microphone sensitivity. A microphone array and camera are arranged to obtain an audio signal and an image, respectively, which correspond with the talker within the environment. The images are displayed via a visualization window or are transmitted to a second device and are displayed to the observer. Visual overlays are provided, via the visualization window, corresponding with pickup zones within the environment, where the pickup zones correspond to areas of heightened microphone sensitivity. The observer may manually adjust the visual overlay corresponding with each pickup zone using the GUI provided, resulting in a manual adjustment of the pickup zones by the microphone array within the environment.

In one example, there is provided a method for enhancing audio quality in telecommunication applications, the method includes: receiving an audio signal via a first and second microphone within an environment; capturing a first image, via a camera, of the environment including a first talker; displaying the first image via a display screen; and generating a first visual overlay of a first pickup zone on the display screen over the first image, wherein the first pickup zone corresponds with a first location of the first talker within the environment.

In one aspect, the first microphone and the second microphone are arranged to have a first sensitivity to the audio signal generated at the first location.

In one aspect, the camera is arranged on or in communication with a first device, and the display screen is arranged on or in communication with a second device.

In one aspect, the first visual overlay of the first pickup zone can be manually positioned by a first observer via a graphical user interface of the second device over the first image of the environment displayed on the second device.

In one aspect, the manual positioning of the first visual overlay by the first observer causes a proportional adjustment to the first pickup zone such that the first pickup zone corresponds with the first visual overlay.

In one aspect, the first pickup zone is automatically generated by the first device or the second device based at least in part on the audio signal received by the first and second microphones.

In one aspect, the first visual overlay is proportionally adjusted by the first device or the second device such that the first visual overlay displayed on the display screen corresponds to the first pickup zone.

In one aspect, the first device or the second device is configured to generate a second visual overlay of a second pickup zone on the display screen and over the first image, wherein the second pickup zone corresponds with a second location of a second talker within the environment.

In one aspect, the first and second microphones are arranged to have a first sensitivity to the audio signal generated at the first location, and the first device or the second device is arranged to generate a first exclusion zone, wherein the first and second microphones are arranged to have a second sensitivity, less than the first sensitivity, to the audio signal generated in the first exclusion zone.

In one aspect, the first exclusion zone can be manually positioned by a first observer via a user interface of the second device; or, the first exclusion zone can be automatically generated by the first device or the second device based at least in part on the audio signal received by the first and second microphones.

In another example, an audio system for generating enhancing audio quality in telecommunications applications is provided, the audio system including a first and second microphone arranged to receive an audio signal from within the environment, a camera arranged to capture a first image of the environment including a first talker, a display screen arranged to display the first image to a first observer, and at least one audio output device arranged to generate a first audio output corresponding with the audio signal, wherein the display screen is arranged to display a first visual overlay of a first pickup zone over the first image, wherein the first pickup zone corresponds with a first location of the first talker within the environment.

In one aspect, the first microphone and the second microphone are arranged to have a first sensitivity to the audio signal generated at the first location.

In one aspect, the camera is arranged on or in communication with a first device and the display screen is arranged on or in communication with a second device.

In one aspect, the first visual overlay of the first pickup zone can be manually positioned by the first observer via a graphical user interface displayed on the second device over the first image of the environment displayed on the second device, and wherein the manual positioning of the first visual overlay by the first observer causes a proportional adjustment to the first pickup zone such that the first pickup zone corresponds with the first visual overlay.

In one aspect, the first pickup zone is automatically generated by the first device based at least in part on the audio signal received by the first and second microphones and the first visual overlay is proportionally adjusted by the first device or the second device such that the first visual overlay displayed on the display screen of a second device corresponds to the first pickup zone.

In one aspect, the first device or the second device is configured to generate a second visual overlay of a second pickup zone on the display screen of a second device and over the first image, wherein the second pickup zone corresponds with a second location of a second talker within the environment.

In one aspect, the first and second microphones are arranged to have a first sensitivity to the audio signal generated at the first location, and the first device or the second device is arranged to generate a first exclusion zone, wherein the first and second microphones are arranged to have a second sensitivity, less than the first sensitivity, to the audio signal generated in the first exclusion zone.

In one aspect, the first exclusion zone can be manually positioned by the first observer via a user interface of the second device; or, the first exclusion zone can be automatically generated by the first device or the second device based at least in part on the audio signal received by the first and second microphones.

In one aspect, the first visual overlay corresponding to the first pickup zone can be modified automatically to indicate the first talker who is actively speaking and wherein the display screen of the audio system is further configured to display a second visual overlay of a second pickup zone over the first image, wherein the second pickup zone corresponds with a second location of a second talker within the environment, and wherein the second visual overlay corresponding to the second pickup zone can be modified automatically to indicate the second talker who is not actively speaking, where the modification to the first visual overlay and the modification to the second visual overlay are different.

In another example, a computer program product stored on a non-transitory computer-readable medium which includes a set of non-transitory computer-readable instructions for generating enhancing audio quality in telecommunications applications is provided, such that, that when the instructions are executed on a processor the computer program product is arranged to: receive an audio signal via a first and second microphone within an environment; capture a first image, via a camera, of the environment including a first talker; display the first image via a display screen; and generate a first visual overlay of a first pickup zone on the display screen over the first image, wherein the first pickup zone corresponds with a first location of the first talker within the environment.

These and other aspects of the various embodiments will be apparent from and elucidated with reference to the aspect(s) described hereinafter.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the various aspects.

DETAILED DESCRIPTION

The present disclosure is directed to an audio system and method for enhancing audio quality in telecommunications applications. Specifically, the methods and systems discussed herein utilize a visualization window of a graphical user interface (GUI) to allow an observer to visualize pickup zones within an environment that schematically represent areas of heightened microphone sensitivity. A microphone array and camera are arranged to obtain an audio signal and an image, respectively, which correspond with a talker within the environment. The images are transmitted to a second device and are displayed to the observer. Visual overlays are provided, via the visualization window, corresponding with pickup zones within the environment, where the pickup zones correspond to areas of heightened microphone sensitivity. In other words, the pickup zones discussed herein are microphone pickup zones which have heightened microphone sensitivity. The observer may manually adjust the visual overlay corresponding with each pickup zone using the GUI provided, resulting in a manual adjustment of the pickup zones by the microphone array within the environment.

Figure 1:
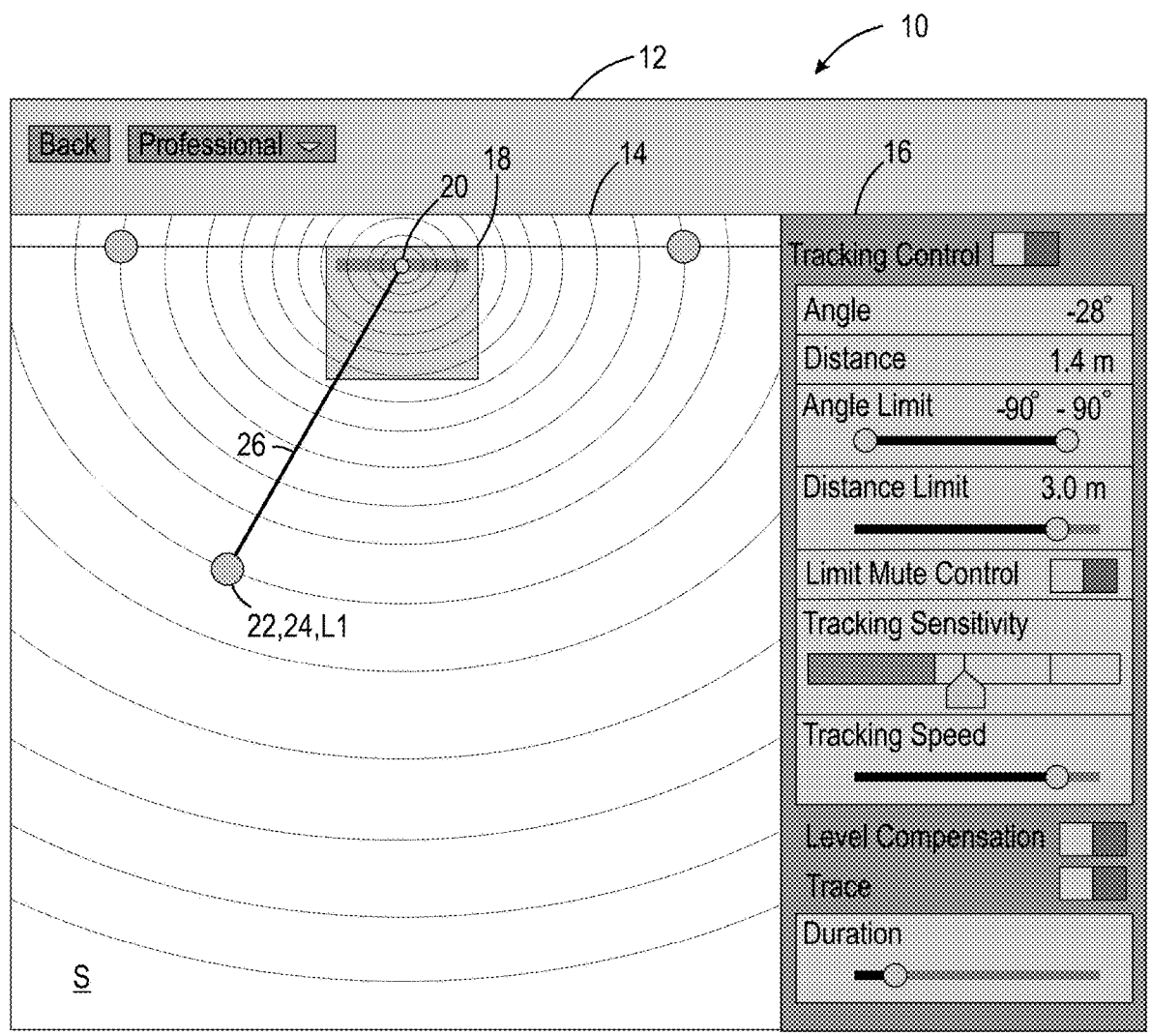
FIG. 1 is a schematic representation of an audio system according to the prior art.

The following description should be read in view of FIGS. 1-4. FIGS. 1-4 illustrate audio systems according to the prior art. FIG. 1 is a schematic view of a Graphical User Interface (GUI) 12 used in an audio system 10 for visualizing beam forming within a space S. GUI 12 includes at least two windows, e.g., a visualization window 14 and a parameter window 16. The visualization window 14 is arranged to generate a two-dimensional schematic representation of space S including any sources of sound 22 within space S with respect to a microphone array 20 of a conference device 18. As illustrated, the location of a source of sound 22, e.g., a first user or speaker 24, can be represented in two-dimensions and a beam path 26 between the first user 24 at a first location L1 and the microphone array 20 of conference device 18 can be schematically represented in visualization window 14.

Figure 2:
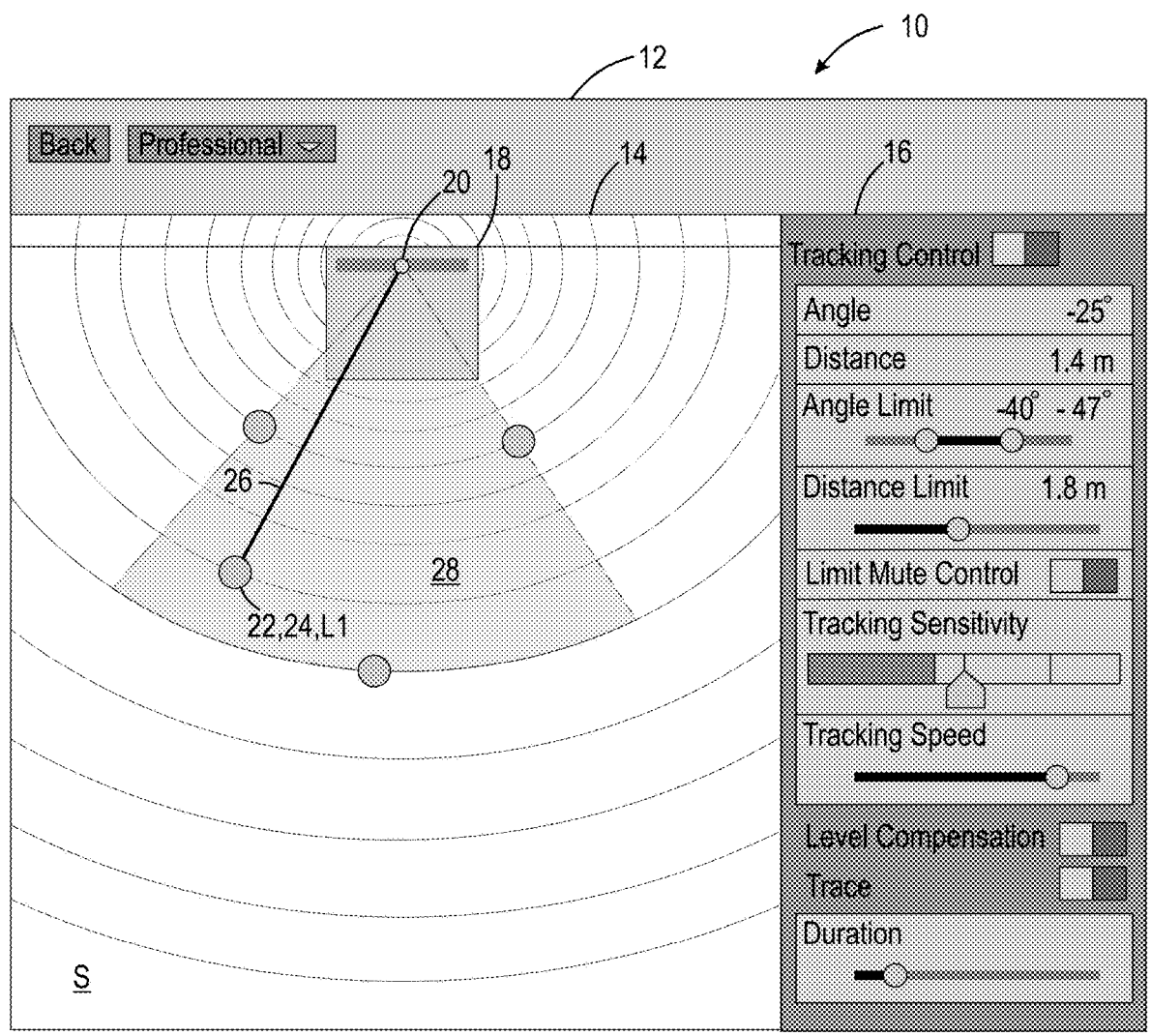
FIG. 2 is a schematic representation of an audio system according to the prior art.

Additionally, as illustrated in FIG. 2, prior art systems may allow for the selection, creation, or generation of a focus area 28 that encompasses beam path 26. As illustrated in FIG. 2, for example, the focus area 28 corresponds with a heightened sensitivity of the microphones of microphone array 20 of conference device 18. In the example illustrated, focus area 28 is arranged between −40 degrees and −47 degrees around beam path 26, where beam path 26 is arranged at an angle of −25 degrees from an imaginary vertical line (not shown) arranged through visualization window 14. As illustrated the focus area 28 may be adjustable by a user observing the visualization window 14 of GUI 12 via the controls disposed in the parameter window 16.

Figure 3:
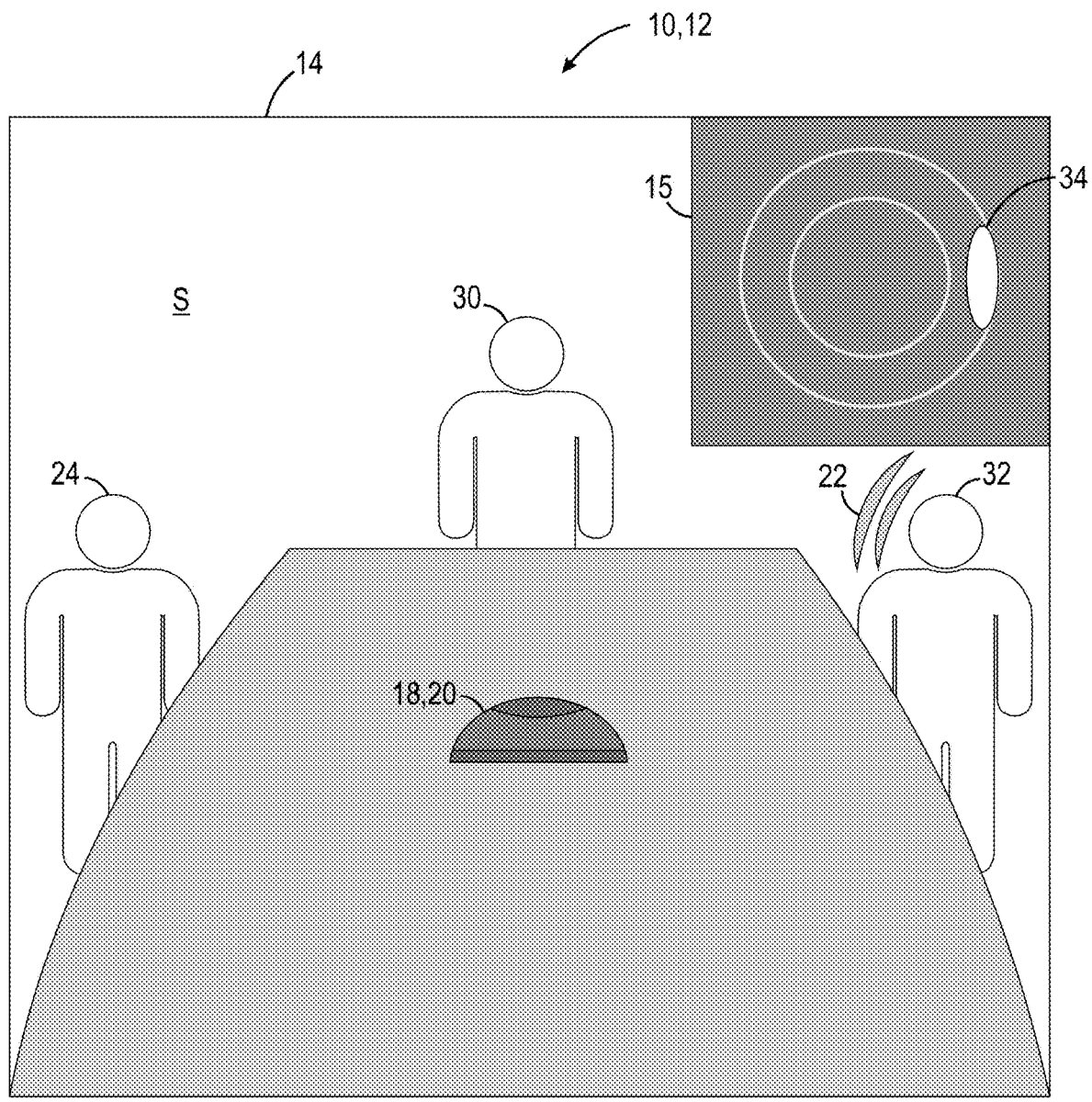
FIG. 3 is a schematic representation of an audio system according to the prior art.
Figure 4:
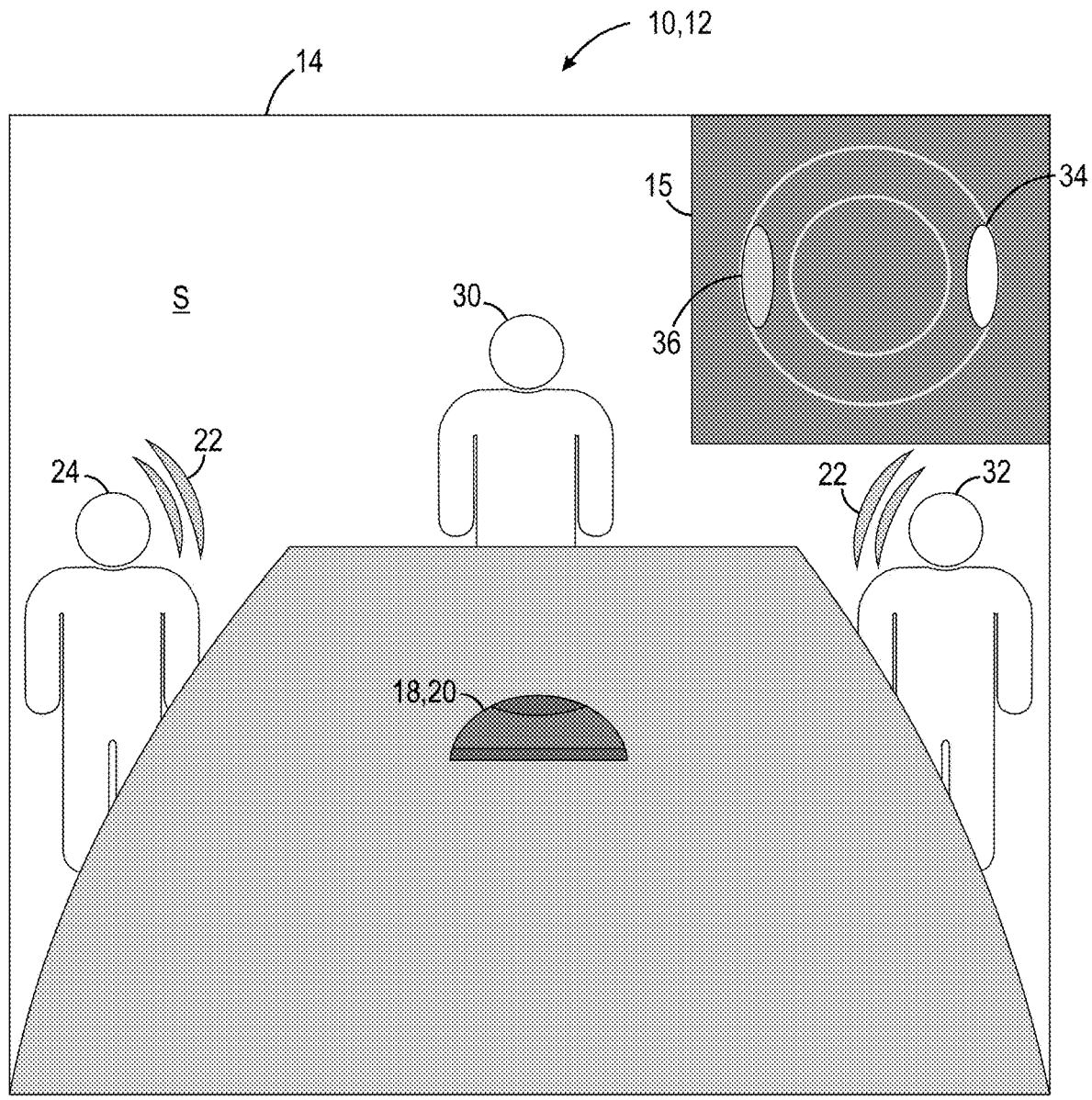
FIG. 4 is a schematic representation of an audio system according to the prior art.

In another example according to the prior art, as illustrated in FIGS. 3-4, audio system 10 may include a conference device 18 within a space S, where the conference device 18 includes a microphone array 20. As illustrated, space S may include multiple sources of sound, e.g., multiple users. FIG. 3 also illustrates that GUI 12 may include a visualization window 14 which illustrates the space S and the objects within space S along with a schematic visualization window 15 which illustrates space S schematically about conference device 12 in 360 degrees. Importantly, FIGS. 3-4 illustrate a composite view created by overlaying the schematic visualization window 15 over a video of people in the space S or room. Thus, the examples illustrated do not utilize real-time visual overlay over the users in the space. In FIG. 3, three separate users are illustrated, e.g., first user 24, second user, 30, and third user 32. When third user 32 speaks or otherwise makes sound 22, as illustrated, schematic visualization window 15 may schematically represent the perceived location of the speaker as a first localized shape 34 with respect to a 360 plot around conference device 12. For example, a circular, spherical, or ellipsoidal shape can be represented in two-dimensions in the perceived location about conference device 12 which corresponds with the location of third user 32 generating noise 22. Similarly, FIG. 4 illustrates that when another user begins to generate sound 22 in addition to third user 32, e.g., if first user 24 begins to speak, a second localized shape 36 is also illustrated on the opposing side of the 360 degree plot shown in schematic representation window 15 of GUI 12, which schematically represents that first user 24 and third user 32 are both speaking and arranged on opposing sides of conference device 12, i.e., arranged 180 degrees apart with respect to the 360 degree plot illustrated.

Figure 5A:
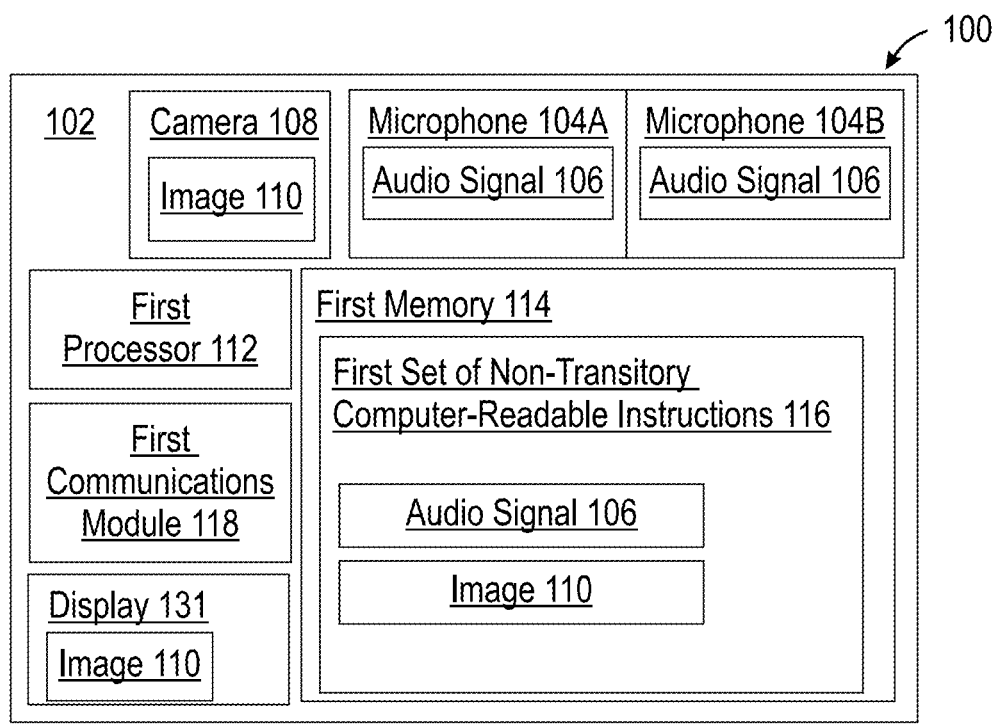
FIG. 5A is a schematic representation of the component parts of a first device according to the present disclosure.
Figure 5B:
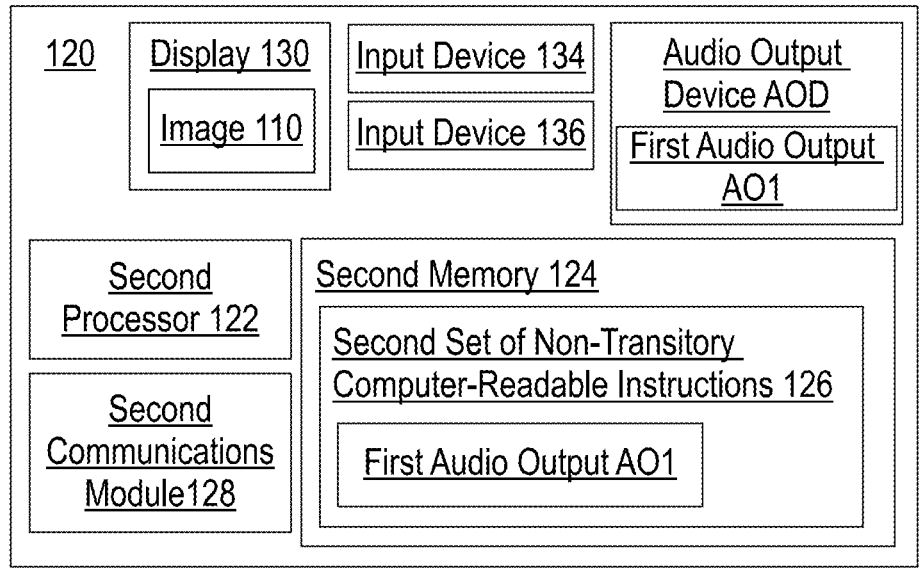
FIG. 5B is a schematic representation of the component parts of a second device according to the present disclosure.
Figure 6:
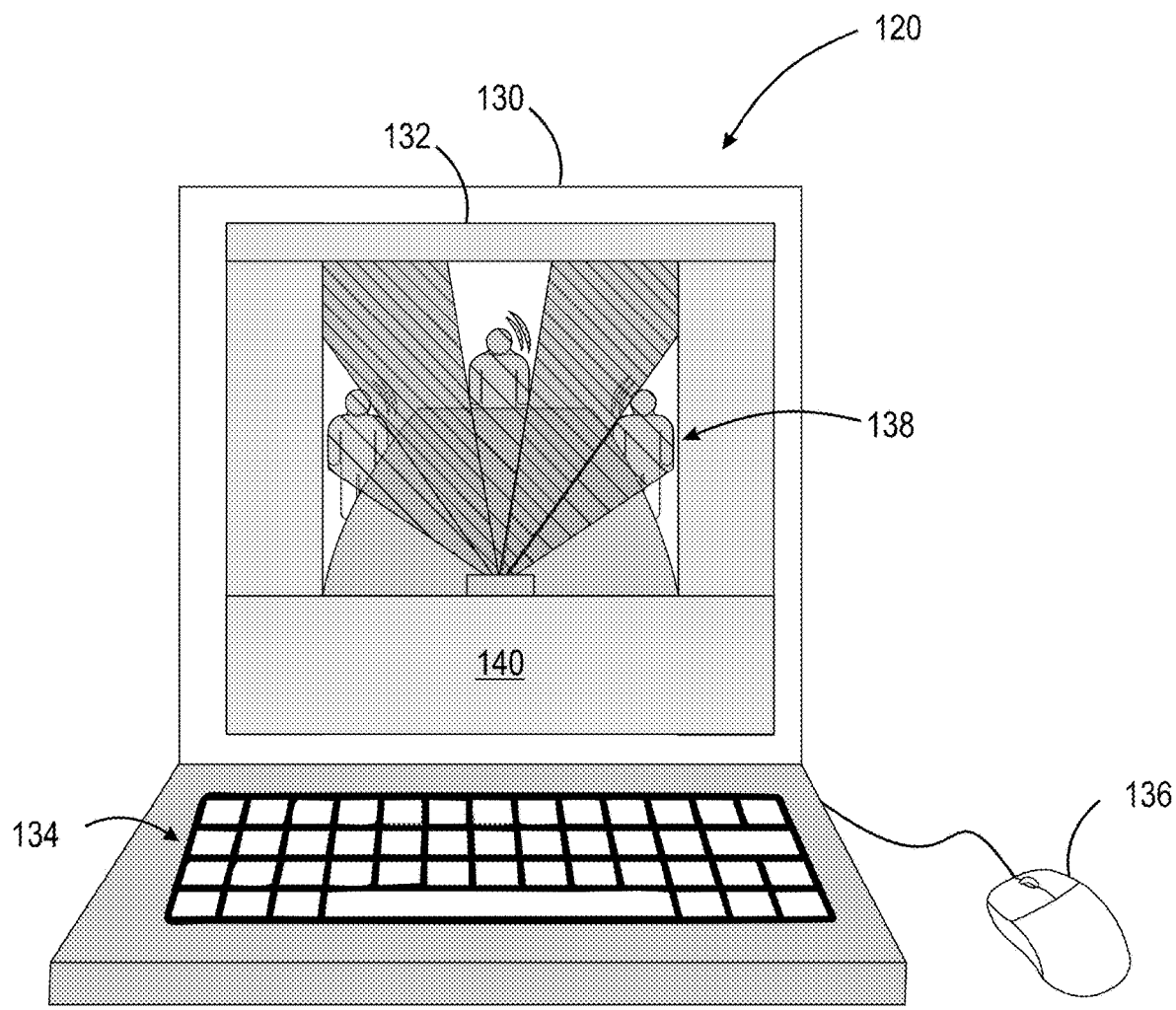
FIG. 6 is a schematic representation of a second device according to the present disclosure.

Turning now to FIGS. 5A-6, which schematically illustrate the component parts of first device 102 of an audio system 100, the component parts of a second device 120 of audio system 100, and a Graphical User Interface (GUI) 132 of a second device 120 according to the present disclosure, respectively. As illustrated, audio system 100 includes a first device 102 which can be arranged within an environment E (shown in FIG. 6). First device 102 includes at least two microphones, e.g., first microphone 104A and second microphone 104B, (collectively referred to herein as "microphones 104" or "microphone array 104"). Microphones 104 are intended to be integrated with, or otherwise in electronic communication with, first device 102 and arranged to receive an audio signal, i.e., audio signal 106 from within environment E. Audio signal 106 may be generated by, for example, a talker or presenter (as will be discussed below) or any device or entity capable of generating sound and energizing microphones 104 within or proximate to environment E. First device 102 also includes a camera 108 arranged to capture and transmit at least one image 110. Camera 108 can be integrally arranged within, or otherwise in electronic communication with, first device 102 such that images 110 of environment E can be captured and stored within first device 102 or captured and sent to a second device 120 (discussed below). Although first device 102 is illustrated and described herein as a stand-alone device, e.g., a teleconference device, it should be appreciated that first device 102 may be any device capable of capturing images 108 from environment E, as well as any device capable of capturing or receiving an audio signal 106 from at least one talker or presenter, for example, first talker T1 (also discussed below). In one example, first device 102 may be selected from at least one of: a conferencing device, a smart phone, a laptop or other personal computer, a tablet, smart TV, etc. Additionally, first device 102 may include a first processor 112 and first memory 114 arranged to execute and store, respectively, a first set of non-transitory computer-readable instructions 116 to perform the functions of first device 102. Furthermore, first device 102 may also include a first communications module 118 which is arranged to send or transmit, via wired or wireless communications, data related to, e.g., images 110 and/or audio signal 106 and/or meta data as discussed above to second device 120. Additionally, it should also be appreciated that first device 102 may further include a display screen 131 for allowing an observer to set parameters, generate, and manipulate the overlays associated with the pickup zones and exclusion zones discussed below with respect to second device 120.

Second device 120 similarly includes a second processor 122 and a second memory 124 arranged to execute and store, respectively a second set of non-transitory computer-readable instructions 126 to perform the functions of second device 120 as will be discussed herein. Furthermore, second device 120 may also include a second communications module 128 which is arranged to receive, via wired or wireless communication data related to, e.g., images 110 and/or audio signal 106 as discussed above sent from first device 102. Additionally, as will be discussed below, second device 120 may also include an audio output device, i.e., first audio output device AOD arranged to generate a first audio output AO1. First audio output device AOD may be a speaker arranged on, in, or in communication with second device 120 (discussed below).

FIG. 6 illustrates a schematic representation of second device 120. Second device 102 further includes display screen 130 which displays a graphical user interface 132 to, for example, a first observer O1 (discussed below). Second device 120 further includes a first user input device 134 and a second user input device 136. First user input device 134 is intended to be a keyboard, while second user input device 136 is intended to be a computer mouse; however, it should be appreciated that any device capable of interfacing between first observer O1 and graphical user interface (GUI) 132 is possible. In one example, display screen 130 is a touch screen display capable of also being a user input. These inputs are utilized to adjust or generate the various pickup zones and exclusion zones discussed below in detail. It should be appreciated that second device 120 is arranged to be in communication with first device 102 and can be arranged within environment E or outside of environment E such that an observer can visualize, interact with, generate, or otherwise manipulate the parameters of the overlays and the exclusion zones (discussed below) while visualizing the environment E, the occupants, talkers, or presenters within the environment E so that adjustments can be made to the system performance based on visualization of the locations of the talkers using the overlays discussed below.

Figure 9:
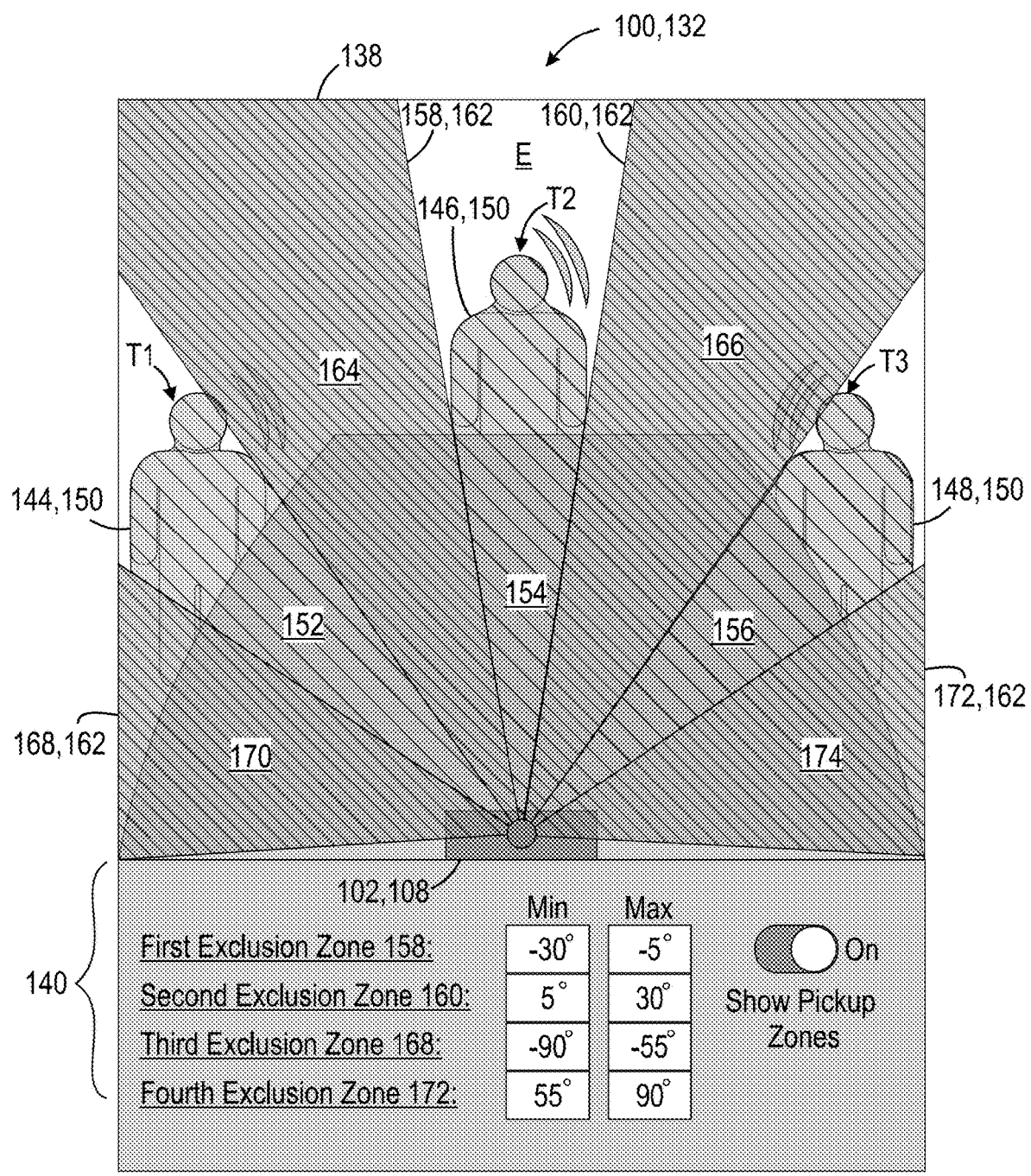
FIG. 9 is a schematic representation of a visualization window and a parameter window according to the present disclosure.

As illustrated in FIG. 6, GUI 132 includes at least one widow for visualizing environment E for visualizing images 110 and/or other information and data received from first device 102 and camera 108, i.e., visualization window 138. This visualization window 138 displays an image or images 110 taken by camera 108 and allows first observer O1 to adjust, manipulate, or generate pickup zones and exclusion zones as will be discussed below. In one example, GUI 132 further includes a second window, i.e., a parameter window 140 arranged to display adjustable parameters for adjusting these pickup zones and exclusion zones as will be discussed below. Adjustable parameters, as illustrated in FIG. 9, may include angle ranges for each pickup zone, angle ranges for each exclusion zone (discussed below), a toggle option for turning on and off each overlay (discussed below).

Figure 7:
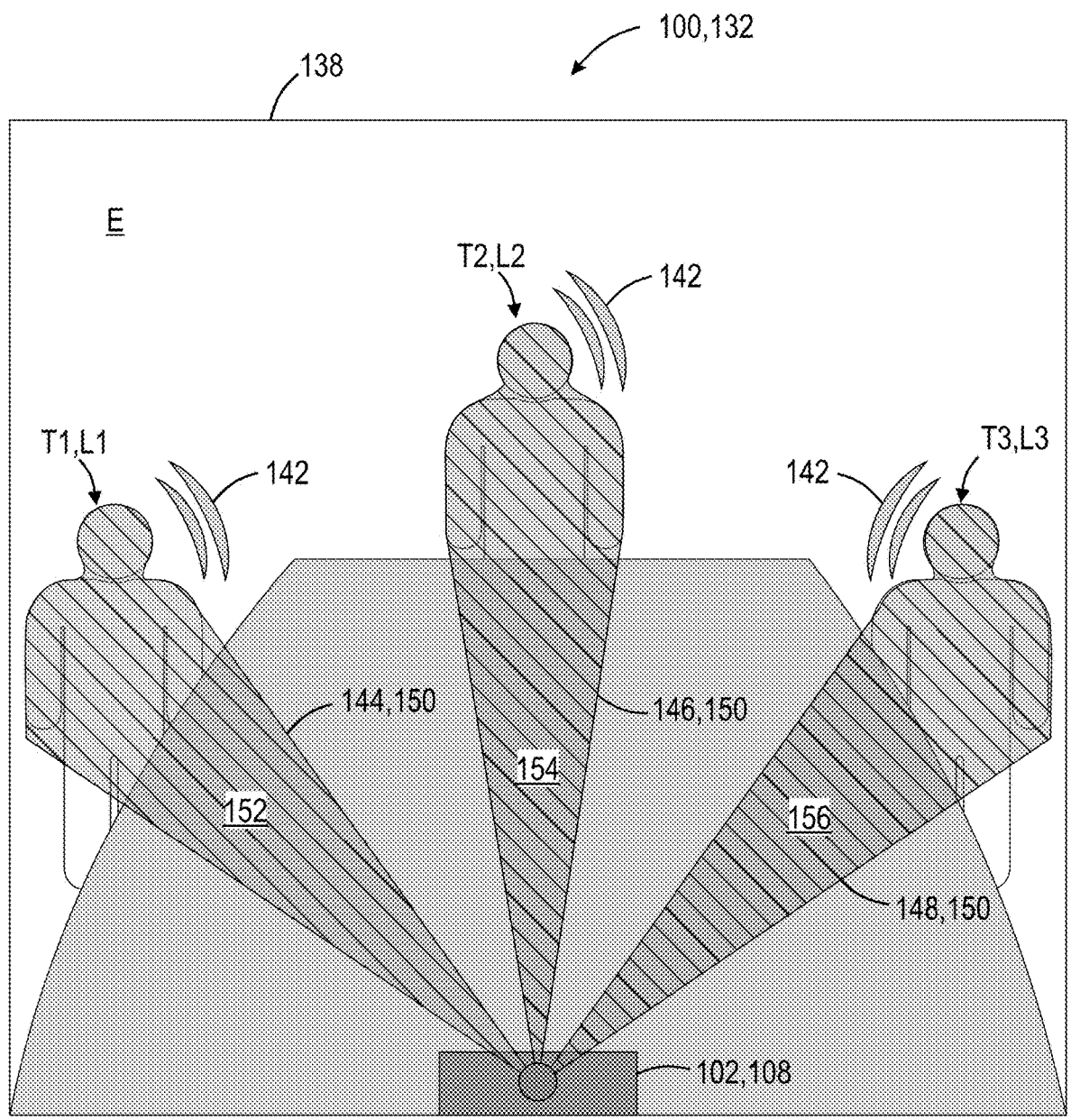
FIG. 7 is a schematic representation of a visualization window according to the present disclosure.

As shown in FIG. 7, which illustrates a close-up schematic representation of visualization window 138, there may be multiple talkers or presenters within environment E, e.g., first talker T1 located at a first location L1, second talker T2 located at a second location L2, and third talker T3 located at a third position L3. First device 102 and/or second device 120 may automatically generate, generate in response to user input (as will be discussed below), or otherwise create pickup zones of heightened microphone sensitivity in the general direction of each talker, for example, while they are speaking or otherwise generating sound 142 received as audio pickup 106. In general, each pickup zone can be represented having a beam width and beam direction at an angle with respect to first device 102. Although FIG. 7 illustrates that image or video 110 includes, as a portion of the image or video 110, a representation of first device 102 schematically as the origin point for the overlays described herein, it should be appreciated that, in an example embodiment, image or video 110 will not contain a representation of first device 102 as first device 102 contains the camera 108 used to take the image. The heightened sensitivity, i.e., first sensitivity 150, in the direction of each talker allows for higher quality audio pickup within the generated zones. In one example, a pickup zone is generated for each talker within environment E, i.e., first pickup zone 144, second pickup zone 146, and third pickup zone 148, corresponding to first talker T1, second talker T2, and third talker T3, respectively. As mentioned above, first device 102 is arranged such that microphones 104 have a heightened sensitivity, i.e., a first sensitivity 150, in each pickup zone such that any audio signal 106 obtained from within those zones is obtained with enhanced clarity. Additionally, first talker T1 may be at an angle of approximately −45 degrees with respect to a center line (not shown) arranged through first device 102 and second talker T2; second talker T2 may be arranged at an angle of approximately 0 degrees with respect to a center line (not shown) arranged through first device 102 and second talker T2; and third talker T3 may be arranged at an angle of 45 degrees with respect to a center line (not shown) arranged through first device 102 and second talker T2. The beam width of each pickup zone may be automatically generated based on the perceived distance or perceived angle of each talker such that a substantial portion of each talker is included within their respective pickup zones at a fixed distance from first device 102. The generation of each pickup zone may be generated automatically by, for example, first device 102, by receiving audio signal 106 from at least one talker, determining via the audio signal 106 the direction or angle that would represent a direct path between at least one talker and the microphones 104 of first device 102, and increasing the sensitivity of microphones 104 to the portion of the audio signal 106 obtained from that direction or angle. As will be discussed below, these pickup zones may also, or in the alternative to automatic generation discussed above, be generated manually by an observer of GUI 132, i.e., first observer O1 during operation of audio system 100.

As illustrated in FIG. 7, each pickup zone is schematically represented by a visual overlay superimposed over a real-time image 110 of environment E. For example, a first visual overlay 152, a second visual overlay 154, and a third visual overlay 156 may be generated for each pickup zone, i.e., first pickup zone 144, second pickup zone 146, and third pickup zone 148, respectively, such that the generated visual overlays can be placed or digitally superimposed over the real-time image 110 of environment E. The digitally superimposed visual overlays are arranged such that an observer of display screen 130 of second device 120, e.g., first observer O1 (discussed below), can visualize each pickup zone within visualization window 138 of GUI 132. It should be appreciated that the visual overlays discussed herein associated with each talker within environment E may be selected such that each overlay associated with a respective pickup zone contains a semi-transparent or translucent visual image, pattern, or color, that can be utilized by an observer to easily distinguish the location of each pickup zone while still maintaining the ability of the observer to see the talker associated with the respective pickup zone. In one example, each overlay may be represented by a different color, e.g., first visual overlay 152 may be a semi-transparent or translucent blue color, second visual overlay 154 may be a semi-transparent or translucent green color, and third visual overlay 156 may be a semi-transparent or translucent red color. Furthermore, it should be appreciated that at least a portion of each pickup zone and each respective visual overlay is intended to overlap at least a portion of the talker or presenter that it is associated with, such that the talker or presenter is associated with the semi-transparent or translucent image, pattern, or color over the associated overlay, thereby allowing the observer to confirm optimal pickup zone arrangements corresponding to people talking within the environment E.

Additionally, in the alternative to the pickup zones being generated automatically by the first device 102 and/or second device 120 as discussed above, first observer O1 may generate the pickup zones manually via graphical user interface 132 using, for example, first user input device 134 and/or second user input device 136, along with parameter window 140 (shown in FIG. 9) and/or visualization window 138. Once generated the observer may manipulate or otherwise alter the directional sensitivity of each pickup zone by, e.g., clicking and dragging one of the visual overlays corresponding to a particular pickup zone using second user input device 136, e.g., a computer mouse, thereby allowing the observer to confirm, correct, or adjust, optimal pickup zone placement corresponding to people talking within environment E. It should be appreciated that as a result of the user manipulation of the overlays superimposed over images 110 on visualization window 138, second device 120 is arranged to send, via second communications module 128 a signal to first communication module 118 of first device 102 such that a change in the visual overlay on visualization window 138 of a particular pickup zone proportionately changes the beam angle or direction, and/or the beam width associated with of the enhanced first sensitivity 150 of microphones 104 such that the microphones 104 pickup enhanced audio signals within the area or path established by the observer manipulating the overlay. As discussed above, it should be appreciated that other inputs can be used to manually manipulate the sensitivity. e.g., a touch screen display and/or first user input device 134.

Figure 8:
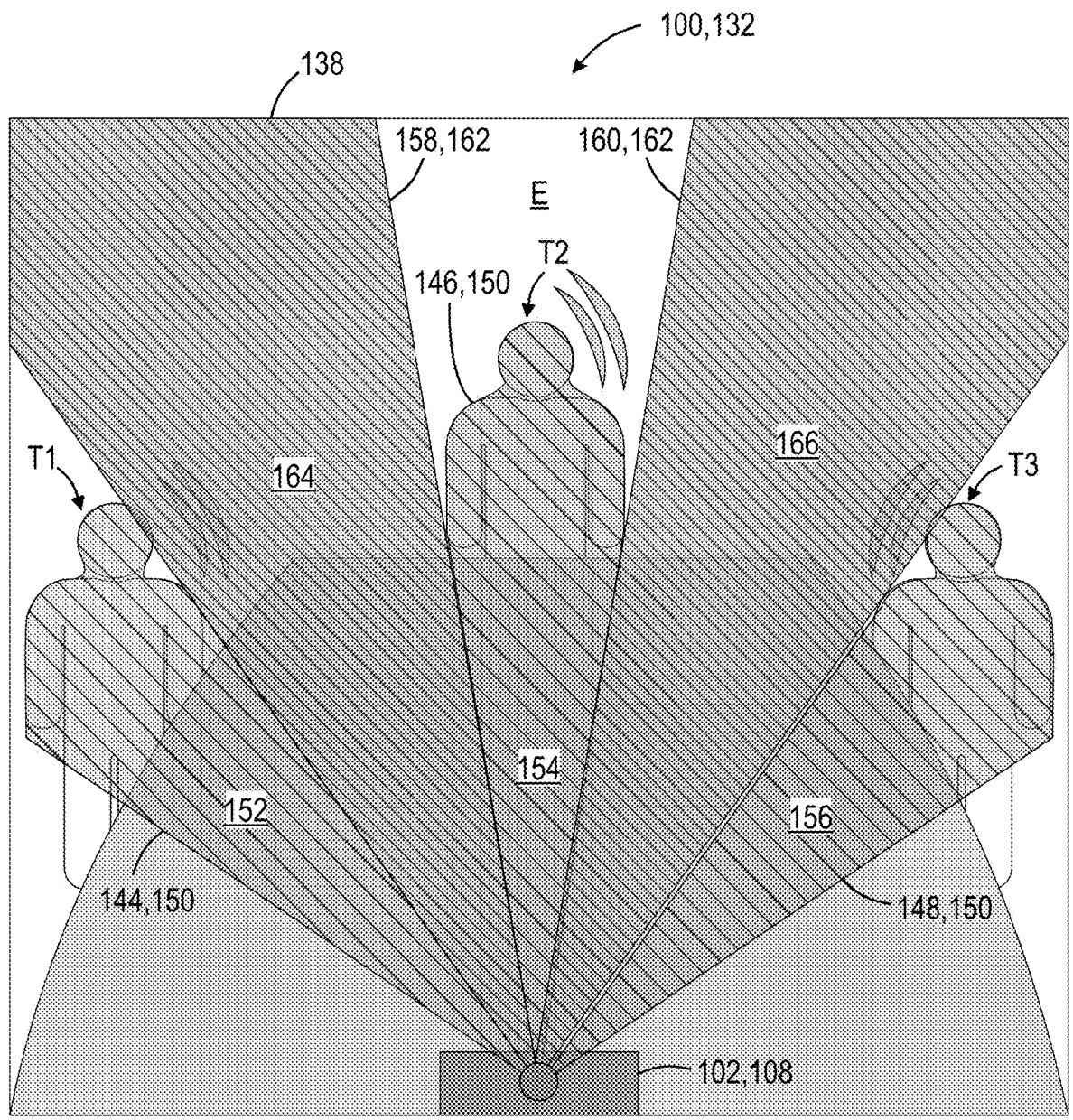
FIG. 8 is a schematic representation of a visualization window according to the present disclosure.

As illustrated in FIG. 8, in addition to generation of pickup zones with first sensitivity 150, first device 102 and/or second device 120 may be arranged to generate multiple exclusion zones, i.e., first exclusion zone 158 and second exclusion zone 160 (collectively referred to as "exclusion zones"). Each exclusion zone corresponds with a zone or area within environment E defined by a direction or angle with respect to first device 102 where the microphones 104 are arranged to have a second sensitivity 162 to the audio signal 106 obtained from that direction or angle, where the second sensitivity 162 is less than the first sensitivity 150 of the pickup zones. In one example, the exclusion zones are defined as the area between at least two pickup zones, e.g., the area between first pickup zone 144 and second pickup zone 146. The decreased sensitivity of second sensitivity 162 within each exclusion zone effectively ignores or eliminates any portion of audio signal 106 received within those regions. These regions are intended to be directed towards zones or areas where no presenter or talker is located and thus it is desirable to remove any sounds emanating from that area as they are expected to be non-speech sounds. As illustrated in FIG. 8, each exclusion zone, i.e., first exclusion zone 158 and second exclusion zone 160 are schematically represented by a first exclusion overlay 164 and a second exclusion overlay 166, respectively. Similarly to the visual overlays of each pickup zones discussed above, it should be appreciated that the exclusion overlays discussed herein associated with each exclusion zone within environment E may be selected such that each overlay associated with a respective exclusion zone contains a semi-transparent or translucent visual image, pattern, or color, that can be utilized by an observer to easily distinguish the location of each exclusion zone. In one example, each exclusion overlay may be represented by a color that indicates exclusion of that area or region, e.g., first exclusion overlay 164 and second exclusion overlay 166 may be represented by a semi-transparent or translucent black or grey color superimposed over the image or images 110 of environment E.

Furthermore, these exclusion zones and exclusion overlays can be generated automatically by first device 102 and/or second device 120; or, they may be generated manually by a first observer O1 using first user input device 134 and/or second user input device 136 and GUI 132. Thus, the combination of pickup zones with enhanced first sensitivity 150 and exclusion zones with decreased second sensitivity 162 creates zones or areas within environment E having heightened audio quality, i.e., the pickup zones, which generally correspond to the location of each talker or object capable of producing sound 142, along with zones of decreased or eliminated audio quality, i.e., the exclusion zones, which generally correspond to areas where no talkers are located. In one example, the exclusion zones are chosen such that areas within environment E which may generate miscellaneous noise that is not a part of the presentation/conversation that is taking place in the foreground can be effectively reduced and/or eliminated from audio signal 106. The exclusion zones may be selected such that if there is another person in the background of the image 110, and the observer does not want any portion of the audio signal 106 to be obtained from the location or position of that person, an exclusion zone may be generated such that it would reduce and/or eliminate any portion of audio signal 106 coming from that direction or location. It should also be appreciated that, in the event that a talker or presenter moves within environment E, the overlays and pickup zones associated with that particular talker or presenter may move with the talker or presenter within the environment. Should the talker or presenter move to a position previously defined by an exclusion zone, the decreased microphone sensitivity, i.e., second sensitivity 162, of the exclusion zone takes precedent with respect to the sensitivity of the microphones coming from the presenter or talking within the exclusion zone. In other words, should the talker move within a predefined exclusion zone, instead of receiving enhanced audio of the presenter or talker from the heightened first sensitivity 150, the audio from the presenter or talker may be diminished. It should also be appreciated that, audio system 100 can be configured such that, in the event a talker or presenter previously identified within the environment should move into a predefined exclusion zone, the sensitivity of the exclusion zone may be temporarily suspended in favor of the increased first sensitivity 150 associated with the pickup zone around the talker or presenter.

FIG. 9 illustrates another example configuration of visualization window 138. In this example, two additional exclusion zones are established, i.e., third exclusion zone 168 and fourth exclusion zone 170 with respective exclusion overlays, i.e., third exclusion overlay 170 and fourth exclusion overlay 174. As illustrated, parameter window 140 can include various input fields corresponding to the beam widths or beam angles of each exclusion zone. For example, first exclusion zone 158 may be arranged between −30 and −5 degrees with respect to first device 102 and/or camera 108; second exclusion zone 160 may be arranged between 5 and 30 degrees with respect to first device 102 and/or camera 108; third exclusion zone 168 may be arranged between −90 and −55 degrees with respect to first device 102 or first camera 108; and fourth exclusion zone 172 may be arranged between 55 and 90 degrees. As illustrated, the exclusion overlays for each respective exclusion zone may be digitally superimposed over images 110 in real-time such that first observer O1 can visually recognize the areas within environment E with decreased second sensitivity 162. Additionally, although not illustrated, second device 120 may be arranged to crop out or cover completely the portions of images 110 that correspond with each exclusion zone such that first observer O1 cannot see anything within those regions via visualization window 138. Additionally, a portion of parameter window 140 may contain a button or slidable switch arranged to toggle on/off the visual overlays corresponding to each pickup zone and/or exclusion zone. Furthermore, although not illustrated, it should be appreciated that instead of the exclusion zones being directed at beam angles and beam width as illustrated in FIGS. 6-9, all four exclusion zones illustrated may alternatively be depicted as vertical boundaries, i.e., arranged substantially parallel with the side border of visualization window 138 and substantially orthogonal to the top and bottom borders of visualization window 138. The arrangement of these vertical exclusion zones can be established automatically as disclosed above, or manually by first observer O1 via parameter window 140. Also, it should be appreciated that in addition to or in the alternative to the exclusion zones and pickup zones depicted or the vertical zones discussed above, exclusion zones may be established horizontally, i.e., arranged substantially orthogonal with the side border of visualization window 138 and substantially parallel with the top and bottom borders of visualization window 138.

Although not illustrated, in one example, audio system 100 is further configured to visually indicate active talkers and non-active or inactive talkers. For example, the first visual overlay 152 corresponding to the first pickup zone 144 can be modified automatically to indicate the first talker T1 who is actively speaking. This may be indicated by a specific brightness, intensity, or color superimposed on the beam path over at least a portion of the first talker, or, alternatively, may be illustrated by a beam path with a first length, for example, a beam path extending from the first device 102 to the back wall of images of video 110. Additionally, the display screen 130 of the audio system 100 is further configured to display a second visual overlay 154 of a second pickup zone 146 over the first image 110, wherein the second pickup zone 146 corresponds with a second location L2 of a second talker T2 within the environment E. wherein the second visual overlay 154 corresponding to the second pickup zone 146 can be modified automatically to indicate the second talker T2 who is not actively speaking, where the modification to the first visual overlay 152 and the modification to the second visual overlay 154 are different. Said another way, the audio system 100 can display multiple beams, i.e., visual overlays, which allow conversations to flow from one talker to another and/or simultaneous talkers. The audio system 100 constantly monitors the voice level of the respective talker within each beam, and when it is determined that one or more beams are aimed at an active talker, that beam's level is enhanced or modified visually, while any other beams that are determined to be associated with an inactive talker are attenuated. This process, implemented by the digital signal processing (DSP) provided by the first or second device, improves the quality of the audio by attenuating open microphones which tend to pick up room or environmental noise, including reflections of the talker's voice off of acoustically reflective surfaces. An observer of the audio system 100 would like to know which, if any, beam has been recognized by the system as active and enhanced and which beam have been determined by system as inactive and attenuated. The method disclosed herein may involve changing color or length of the respective beams to highlight or indicate an active speaker or inactive speaker provides the observer with the additional information of which beams are active and which are inactive which will further aid in adjusting the system for optimal performance.

Figure 10:
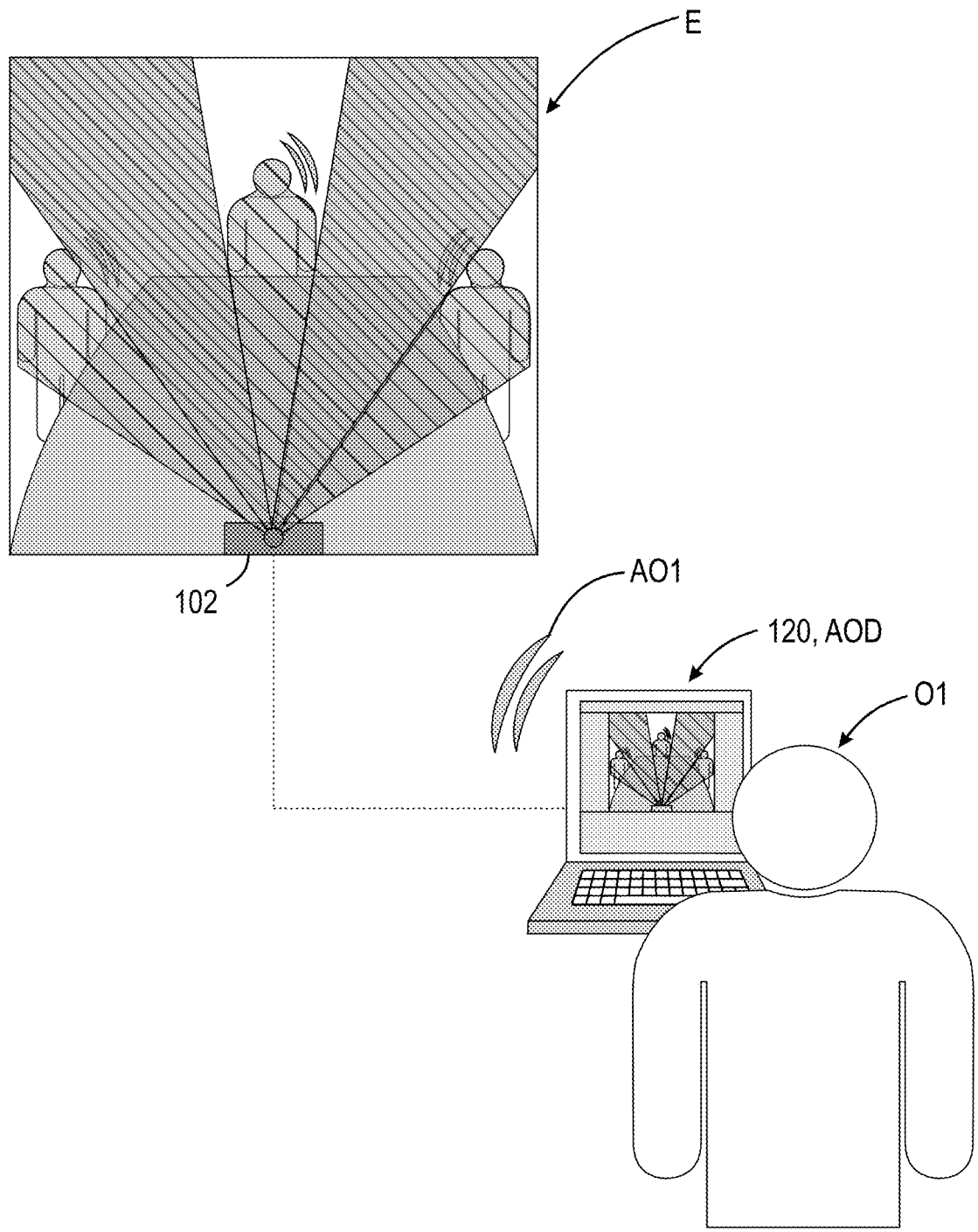
FIG. 10 is a schematic representation of an audio system according to the present disclosure.

FIG. 10 illustrates a schematic representation of audio system 100 including environment E and second device 120. As illustrated, images 110 captured by camera 108 (which may or may not be integrally connected to first device 102) is arranged to send an audio signal 106 obtained from within environment E from, for example, any of the talkers or objects capable of producing sound within environment E, to second device 120. The data stream corresponding to images 110 and/or audio signal 106 sent from first device 102 to second device 120 is represented schematically by a dotted line in FIG. 10. Once the data stream is received by second device 120, images 110 are displayed in real-time on a display screen 130 of second device such that first observer O1 may visualize the pickup overlays and exclusion overlays described above, and manipulate them as needed using, for example, first user input device 134, second user input device 136, visualization window 138, and/or parameter window 140. Additionally, in an example where second device 120 is arranged outside of environment E, once received, audio signal 106 may be used to generate an audio output, e.g., first audio output AO1, via first audio output device AOD such that the first observer O1 can hear the sound generated within environment E.

The following example should be read in view of FIGS. 5A-10. During operation of audio system 100, at least one talker, e.g., a first talker T1, and at least one observer, e.g., O1 may establish a connection, via wired or wireless connections locally, or over the internet between two devices, i.e., a first device 102 and a second device 120. The connection may utilize the internet or local communications to send and/or receive images 110 and/or audio signals 106 obtained from environment E between first device 102 and second device 120. Images 110 may be a captured by a camera 108 integrally arranged or otherwise in communication with first device 102, and audio signal 106 can be obtained from microphones 104. The images 110 and/or audio signal 106 may be utilized within an audio or teleconferencing application arranged to be executable on first device 102 and second device 120. In response to obtaining audio signal 106 from within environment E, first device 102 and/or second device 120 may establish or generate pickup zones, e.g., first pickup zone 144 corresponding to the location of first talker T1 within environment E. First pickup zone 144 may be defined by a direction or angle with respect to first device 102 and spanning the area between first device 102 and first talker T1. First pickup zone 144 may be defined with a beam angle and a beam width which substantially corresponds with the position of first talker T1 within environment E. First pickup zone 144 corresponds with a portion of audio signal 106 obtained within the defined zone or area by microphones 104 with heightened sensitivity, i.e., first sensitivity 150. Optionally, at least one exclusion zone, e.g., first exclusion zone 158 may be generated within environment E similarly to first pickup zone 144 except that first exclusion zone 158 corresponds with a portion of audio 106 obtained within an area of zone of environment E by microphones 104 with decreased sensitivity, i.e., second sensitivity 162.

First device 102 or second device 120 may then be utilized to display a visualization of the pickup zones and exclusion zones to a first observer O1. For example, second device 120 may display a GUI 132 on a display screen 130 of second device 120 such that first observer O1 can visualize the pickup zones and exclusion zones described above. Images 110 of environment E taken by camera 108 can be displayed in a visualization window 138 of GUI 132 in real-time such that first observer O1 can see and hear the first talker T1 in real-time. Second device 120 may be arranged to generate a first visual overlay 152 which is superimposed over images 110 of environment E within visualization window 138 corresponding to first pickup zone 144 such that first observer O1 can visualize the areas within environment E which correspond with heightened microphone sensitivity, i.e., first sensitivity 150. Similarly, a first exclusion overlay 164 can be generated and superimposed over images 110 of environment E displayed in visualization window 138 such that first observer O1 can visualize the areas within environment E which correspond to decreased microphone sensitivity, i.e., second sensitivity 164. It should be appreciated that the first device 102 and/or second device 120 may generate the foregoing pickup zones and exclusion zones, as well as generate the respective overlays, automatically.

Using various user inputs, e.g., first user input device 134, second user input device 136, or a touch screen input, first observer O1 may manually establish, generate, or manipulate, the position, direction, angle, beam width, etc., of each overlay, i.e., first visual overlay 152. Any change in position of the visual overlay by first observer O1, results in the sending of instructions to first device 102 to alter or adjust areas that microphones 104 are arranged to employ heightened first sensitivity 150 such that the position or angle of the visual overlay beam corresponds to the angle or direction within environment E that microphones 104 exhibit heightened sensitivity to.

It should be appreciated that in the examples described above, the various visual overlays as well as the exclusion overlays may be created or generated and superimposed over images 110 on first device 102 and then transmitted, via a wired or wireless connection to a second device 120 for display. Additionally, it should be appreciated that the first device 102 may be arranged to obtain images 110 of environment E, as well as generate and superimpose the visual overlays and/or the exclusion overlays on a display connected to the first device 102, e.g., an integral display. Furthermore, the visual overlays and exclusion overlays may be sent to a second device 120 of an end-user, e.g., first observer O1 if the first observer O1 is arranged outside of environment E, where second device 120 is arranged to generate and superimpose the visual overlays and exclusion overlays onto images 110 for display on second device 120. Also, it should be appreciated that, although the foregoing examples are intended to utilize images 110 in real-time to form a real-time video of environment E where the visual overlays and exclusion overlays are superimposed over a video, i.e., images 110, in real-time, it should be appreciated that the first device 102 or the second device 120 may be arranged to display still images, i.e., only a single image 110 or two images 110 or three images, etc.

Figure 11:
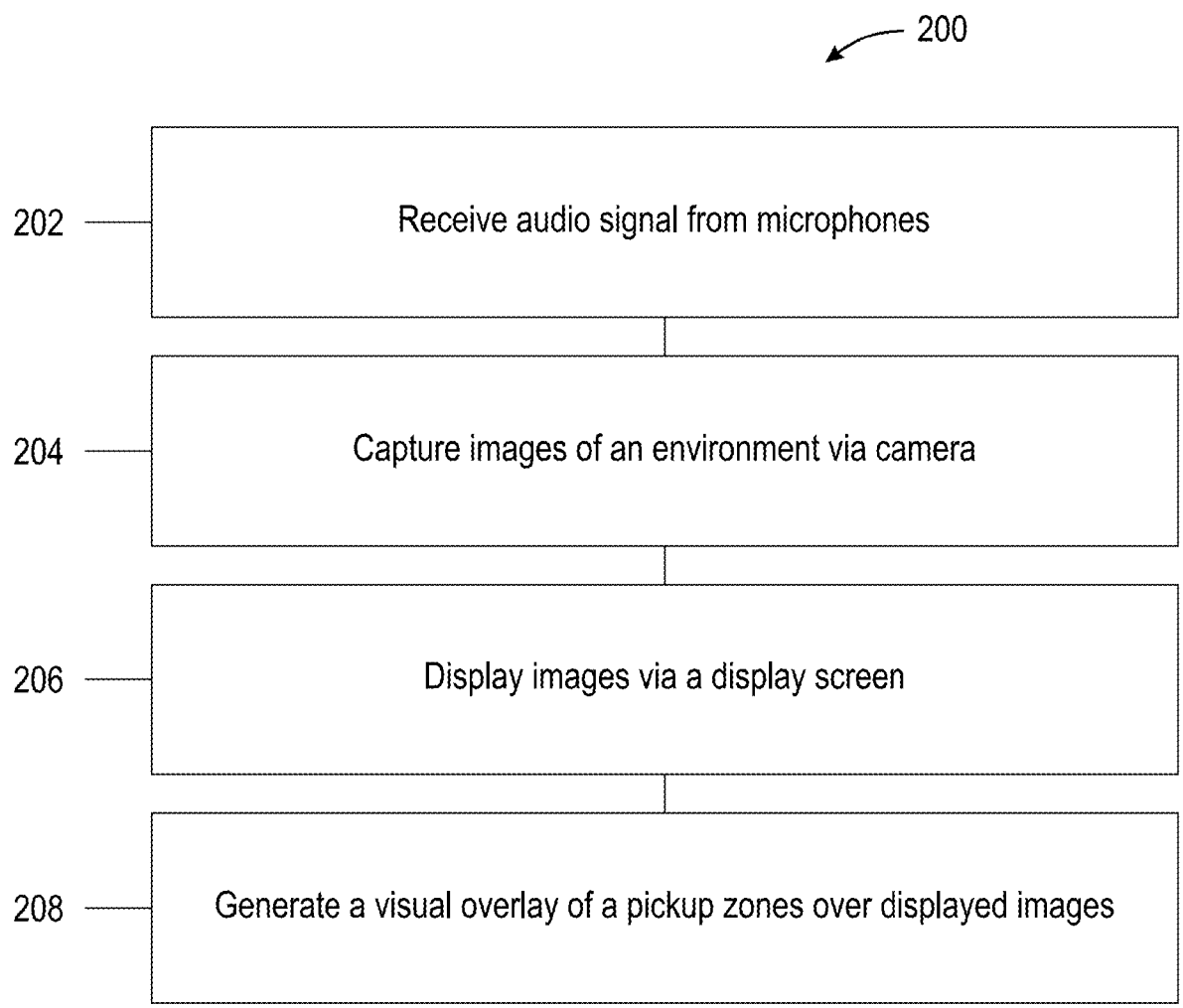
FIG. 11 is a flow chart illustrating the steps of a method according to the present disclosure.

FIG. 11 is a flow chart illustrating the steps of method 200 according to the present disclosure. Method 200 may include, for example: receiving an audio signal 106 via a first (104A) and second (104B) microphone of a first device 102 within an environment E (step 202); capturing a first image 110, via a camera 108, of the environment E including a first talker T1 (step 204); displaying the first image 110 via a display screen 130 (step 206); and generating a first visual overlay 152 of a first pickup zone 144 on the display screen 130 over the first image 110, wherein the first pickup zone 144 corresponds with a first location L1 of the first talker T1 within the environment E (step 208).

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of" "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

The above-described examples of the described subject matter can be implemented in any of numerous ways. For example, some aspects may be implemented using hardware, software or a combination thereof. When any aspect is implemented at least in part in software, the software code can be executed on any suitable processor or collection of processors, whether provided in a single device or computer or distributed among multiple devices/computers.

The present disclosure may be implemented as a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN)

or a wide area network (WAN), or the connection may be made to an external computer (for example, through the Internet using an Internet Service Provider). In some examples, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to examples of the disclosure. It will be understood that each block of the flowchart illustrations and/or block diagrams, and combinations of blocks in the flowchart illustrations and/or block diagrams, can be implemented by computer readable program instructions.

The computer readable program instructions may be provided to a processor of a, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various examples of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Other implementations are within the scope of the following claims and other claims to which the applicant may be entitled.

While various examples have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the examples described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific examples described herein. It is, therefore, to be understood that the foregoing examples are presented by way of example only and that, within the scope of the appended claims and equivalents thereto, examples may be practiced otherwise than as specifically described and claimed. Examples of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method for enhancing audio quality in telecommunication applications, the method comprising:
    receiving an audio signal via a first and second microphone within an environment;
    capturing a first image, via a camera, of the environment including a first talker;
    displaying the first image via a display screen; and
    generating a first visual overlay of a first pickup zone on the display screen over the first image, wherein the first pickup zone corresponds with a first location of the first talker within the environment and is based on the audio signal received by the first and second microphone.

2. The method of claim 1, wherein the first microphone and the second microphone are arranged to have a first sensitivity to the audio signal generated at the first location.

3. The method of claim 1, wherein the camera is arranged on or in communication with a first device, and the display screen is arranged on or in communication with a second device.

4. The method of claim 3, wherein the first visual overlay of the first pickup zone can be manually positioned by a first observer via a graphical user interface of the second device over the first image of the environment displayed on the second device.

5. The method of claim 4, wherein the manual positioning of the first visual overlay by the first observer causes a proportional adjustment to the first pickup zone such that the first pickup zone corresponds with the first visual overlay.

6. The method of claim 3, wherein the first pickup zone is automatically generated by the first device based at least in part on the audio signal received by the first and second microphones.

7. The method of claim 6, wherein the first visual overlay is proportionally adjusted by the first device or the second device such that the first visual overlay displayed on the display screen corresponds to the first pickup zone.

8. The method of claim 3, wherein the first device or the second device is configured to generate a second visual overlay of a second pickup zone on the display screen and over the first image, wherein the second pickup zone corresponds with a second location of a second talker within the environment.

9. The method of claim 8, wherein the first and second microphones are arranged to have a first sensitivity to the audio signal generated at the first location, and the first device or the second device is arranged to generate a first exclusion zone, wherein the first and second microphones are arranged to have a second sensitivity, less than the first sensitivity, to the audio signal generated in the first exclusion zone.

10. The method of claim 9, wherein the first exclusion zone can be manually positioned by a first observer via a user interface of the second device; or, the first exclusion zone can be automatically generated by the first device or the second device based at least in part on the audio signal received by the first and second microphones.

11. An audio system for generating enhancing audio quality in telecommunications applications, the audio system comprising:
   a first and second microphone arranged to receive an audio signal from within the environment;
   a camera arranged to capture a first image of the environment including a first talker; and,
   a display screen arranged to display the first image to a first observer;
   at least one audio output device arranged to generate a first audio output corresponding with the audio signal;
   wherein the display screen is arranged to display a first visual overlay of a first pickup zone over the first image, wherein the first pickup zone corresponds with a first location of the first talker within the environment and is based on the audio signal received by the first and second microphone.

12. The audio system of claim 11, wherein the first microphone and the second microphone are arranged to have a first sensitivity to the audio signal generated at the first location.

13. The audio system of claim 11, wherein the camera is arranged on or in communication with a first device, and the display screen is arranged on or in communication with a second device.

14. The audio system of claim 13, wherein the first visual overlay of the first pickup zone can be manually positioned by the first observer via a graphical user interface displayed on the second device over the first image of the environment displayed on the second device, and wherein the manual positioning of the first visual overlay by the first observer causes a proportional adjustment to the first pickup zone such that the first pickup zone corresponds with the first visual overlay.

15. The audio system of claim 13, wherein the first pickup zone is automatically generated by the first device based at least in part on the audio signal received by the first and second microphones and wherein the first visual overlay is proportionally adjusted by the first device or the second device such that the first visual overlay displayed on the display screen of a second device corresponds to the first pickup zone.

16. The audio system of claim 13, wherein the first device or the second device is configured to generate a second visual overlay of a second pickup zone on the display screen of a second device and over the first image, wherein the second pickup zone corresponds with a second location of a second talker within the environment.

17. The audio system of claim 16, wherein the first and second microphones are arranged to have a first sensitivity to the audio signal generated at the first location, and the first device or the second device is arranged to generate a first exclusion zone, wherein the first and second microphones are arranged to have a second sensitivity, less than the first sensitivity, to the audio signal generated in the first exclusion zone.

18. The audio system of claim 17, wherein the first exclusion zone can be manually positioned by the first observer via a user interface of the second device; or, the first exclusion zone can be automatically generated by the first device or the second device based at least in part on the audio signal received by the first and second microphones.

19. The audio system of claim 11, wherein the first visual overlay corresponding to the first pickup zone can be modified automatically to indicate the first talker who is actively speaking and wherein the display screen of the audio system is further configured to display a second visual overlay of a second pickup zone over the first image, wherein the second pickup zone corresponds with a second location of a second talker within the environment, and wherein the second visual overlay corresponding to the second pickup zone can be modified automatically to indicate the second talker who is not actively speaking, where the modification to the first visual overlay and the modification to the second visual overlay are different.

20. A computer program product stored on a non-transitory computer-readable medium which includes a set of non-transitory computer-readable instructions for generating enhancing audio quality in telecommunications applications, that when executed on a processor is arranged to:
   capture a first image, via a camera, of an environment including a first talker;
   display the first image via a display screen; and
   generate a first visual overlay of a first pickup zone on the display screen over the first image, wherein the first pickup zone corresponds with a first location of the first talker within the environment and is based on the audio signal received by a first and second microphone within the environment.

* * * * *